United States Patent [19]

Pairaudeau et al.

[11] 4,111,710

[45] Sep. 5, 1978

[54] METHOD OF INCORPORATING CARBON FIBERS INTO CEMENT TO PRODUCE REINFORCED STRUCTURES HAVING IMPROVED FLEXURAL STRENGTHS

[75] Inventors: Reginald David Pairaudeau; David Turnbull; Leonard Graham Bevan, all of Bristol, United Kingdom

[73] Assignee: Union Carbide Corporation, New York, N.Y.

[21] Appl. No.: 753,820

[22] Filed: Dec. 23, 1976

[51] Int. Cl.$^2$ .......................... C04B 7/02; C04B 7/35
[52] U.S. Cl. ........................................ 106/90; 106/99
[58] Field of Search ..................................... 106/99, 90

[56] References Cited

U.S. PATENT DOCUMENTS 3,716,386  2/1973  Kempster ............................... 106/99

*Primary Examiner*—J. Poer
*Attorney, Agent, or Firm*—John S. Piscitello

[57] ABSTRACT

Method of incorporating carbon fibers into an aqueous hardenable hydraulic cementitious matrix to produce a formable composition which can be set to produce a reinforced structure having improved flexural strength, and improved resistance to cracking and spalling, which employs a polyethylene oxide in an amount sufficient to effect separation of the individual fibers of the fiber strands present in the mix and uniformly disperse them throughout the mix.

20 Claims, No Drawings

METHOD OF INCORPORATING CARBON FIBERS INTO CEMENT TO PRODUCE REINFORCED STRUCTURES HAVING IMPROVED FLEXURAL STRENGTHS

BACKGROUND OF THE INVENTION

This invention relates to an improved method of incorporating carbon fibers into an aqueous hardenable hydraulic cementitious matrix to produce a formable composition which can be set to produce a carbon fiber-reinforced cementitious product having improved flexural strength and improved resistance to cracking and spalling. More particularly, this invention relates to the preparation of a carbon fiber-reinforced structure having improved flexural strength and improved resistance to cracking and spalling from a formable composition containing a polyethylene oxide as a deflocculent to effect uniform dispension of carbon fibers into a hydraulic cementitious matrix.

The use of polyethylene oxide to facilitate the incoporation of fibers into cementitious compositions has been disclosed in U.S. Pat. No. 3,716,386. Thus, according to said patent, small amounts of this material can be employed to prevent clumping of fibrous substances employed in the reinforcement of cement. It has been found, however, that when polyethylene oxide is employed in carbon fiber-reinforced cement in the amounts disclosed in said patent, a decrease in the flexural strength of the product occurs.

SUMMARY OF THE INVENTION

In accordance with the present invention it has now been discovered that carbon fiber-reinforced cementitious structures having improved flexural strength, and improved resistance to cracking and spalling, can be prepared from formable hydraulic cementitious matrices containing carbon fibers as a reinforcing agent and an amount of polyethylene oxide sufficient to deflocculate the fiber strands or bundles employed in the mix.

DETAILED DESCRIPTION OF THE INVENTION

While the lubricating and friction-reducing properties of polyethylene oxide are well known, and such material has been used to facilitate the incorporation of carbon fibers into cementitious compositions, only amounts of polyethylene oxide sufficient to prevent clumping of the fiber strands or bundles employed have heretofore been employed. When such limited amounts of polyethylene oxide are employed, however, it has been found that the fiber-reinforced products produced from such compositions fail to exhibit any improvement in flexural strength compared to conventional carbon fiber-reinforced cementitious structures which do not contain any polyethylene oxide additive. Indeed, such small amounts of polyethylene oxide have actually been found to cause a decrease in the flexural strength of such products. When polyethylene oxide is added to cementitious compositions in an amount sufficient to not only prevent clumping of the fiber strands or bundles present, however, but also to effect separation of the individual fibers of such strands or bundles and more or less uniformly dispose them throughout the mix, the fiber-reinforced structures prepared from such compositions have been found to exhibit increases in flexural strength in excess of twenty percent (20%) over the flexural strength of structures prepared from like compositions not containing polyethylene oxide. The reinforced structures containing such amounts of polyethylene oxide have also been found to exhibit increased resistance to cracking and spalling.

Any hydraulic cement can be employed in the cement compositions of the invention. Aggregate filler material may be employed together with the hydraulic cement in amounts conventionally employed. If a filler is employed, however, it is preferably a fine non-abrasive aggregate material, such as fly ash, and does not exceed twenty parts by weight of the total weight of cement and aggregate material.

The polyethylene oxide suitable for use in the present invention is water soluble, has a molecular weight of from about 500,000 up to about 5,000,000, and is commercially available from Union Carbide Corporation under the trademark "Polyox." Grade WSR-301 has been found to be especially suitable. This grade has a molecular weight of about 4,000,000.

In order to obtain the desired improvement in flexural strength, and resistance to cracking and spalling, in the cementitious structures of the present invention, the polyethylene oxide should be employed in an amount equal to at least 0.14 part by weight per 100 parts by weight of the "dry components" employed. By "dry components" in this context is meant the cement and other solid aggregate filler material (if present) which together make up the cementitious composition, but not including the carbon fiber present or the polyethylene oxide itself. Excess amounts of polyethylene oxide do not appear to have any beneficial effects. For this reason, amounts of polyethylene oxide in excess of about 0.50 part by weight per 100 parts by weight of the dry components present are unnecessary.

High modulus, high strength carbon fibers suitable for use in the instant invention can be prepared as described in U.S. Pat. Nos. 3,454,362 and 3,412,062, and U. K. Pat. No. 1,416,614. The term "carbon" as used herein is intended to include graphitic and non-graphitic fibers.

The length of the carbon fibers employed may be varied to suit requirements, typical lengths being 5 mm. to 75 mm. The thickness of the fibers may vary from about 5 microns to about 25 microns, but is usually within the range of about 7 microns to 9 microns.

The amount of fibers employed is such as to obtain the desired strength characteristics, typically from 1 part by weight to 6 parts by weight of fibers per 100 parts by weight of the dry components (as above defined) in the mix. Most usually the fibers are present in an amount of from 2.5 parts by weight to 5 parts by weight per 100 parts by weight of the dry materials.

The water, of course, must be employed in an amount sufficient to hydrate the cement. In order to produce cementitious products having maximum strength, however, the amount of water should be held to a minimum consistent with this purpose. Typically, from about 25 parts by weight to about 55 parts by weight, preferably from about 30 parts by weight to 45 parts by weight, of water per 100 parts by weight of the dry components in the mix are employed.

Mixing of the components of the cementitious composition, including the cement itself, aggregate material (if present), reinforcing carbon fibers, polyethylene oxide additive, and the required amounts of water, can be effected using conventional techniques. To facilitate dissolution of the polyethylene oxide, it is preferred to add this material to the water before it is admixed with the other components of the mixture. The carbon fibers are preferably added last, in a gradual manner and with stirring to ensure proper separation of the fiber strands or bundles and uniform dispersion of the individual filaments throughout the mix.

After formulation of the cementitious composition, as described above, it may be cast, moulded or extruded into a desired shape, and then allowed to set under suitable conditions to produce the carbon fiber-reinforced cementitious structures of the present invention.

The following examples are set forth for purposes of illustration so that those skilled in the art may better understand this invention. It should be understood that they are exemplary only, and should not be construed as limiting this invention in any manner.

EXAMPLE 1

A formable cementitious composition was produced by admixing the ingredients shown in Table 1 below. A second like composition, differing from the first composition only in the omission of the polyethylene oxide additive, was also prepared. All parts by weight expressed in the table are parts by weight per 100 parts by weight of dry components present, i.e., cement and fly ash.

Table 1

| Constituent | Weight (grams) | Parts by Weight |
|---|---|---|
| Cement | 2700 | 90 |
| Fly Ash | 300 | 10 |
| Carbon Fibers | 120 | 4 |
| Water | 1500 | 50 |
| Polyethylene Oxide | 6 | 0.2 |

The cement and fly ash were first dry blended for 2 minutes in a 5-gallon power-operated mixer using a dough hook attachment. A solution of the polyethylene oxide in the water, or plain water, as the case may be, was then added and mixing was continued for an additional 3 minutes. Handfuls of the carbon fibers were then added as stirring was continued for an additional 8 minutes.

In the case where the polyethylene oxide solution was employed, the solution was prepared by slowly adding fine granules of polyethylene oxide to the water while stirring with a propeller, and then allowing the mixture to stand for 18–20 hours to permit complete dissolution. The polyethylene oxide employed was Polyox WSR-301, manufactured by Union Carbide Corporation, U.S.A. This resin is a fine white granular solid having a molecular weight of about 4,000,000.

The cement employed was Swiftcrete ® cement, an ultra high early strength Portland cement manufactured by the Blue Circle Group of the Cement Marketing Company Limited, United Kingdom.

The fly ash employed was Stourport B fly ash, obtained from the Stourport B electricity generating station in Worchestershire, United Kingdom. This material meets the requirements of British Standard 3892, 1965.

The carbon fibers employed were Hyfil 27 ®, chopped to a length of 6 mm. Hyfil 27 is manufactured by Hyfil Limited, United Kingdom, and consists of a continuous tow of 10,000 carbon filaments having an average diameter of 7-9 microns and characterized by an average Young's modulus of $27 \times 10^6$ psi. and an average tensile strength of $300 \times 10^3$ psi.

After each cementitious composition was prepared it was transferred to a 9" × 12" mould made of wood and waxed to facilitate de-moulding. In each instance the bottom of the mould had first been covered with a sheet of absorbtive paper (approximately 0.5 mm. thick). After the mixture had been poured into the mould, it was lightly compacted with a 2" × 2" wooden block, and covered with a further sheet of paper. A snugly fitting plate of a platen press was then placed over the paper, and the mixture was further compacted by applying a pressure of 150 psi. for 5 minutes. Any water which exuded from the mould during this time was wiped away to prevent it from re-entering the mould. The mix was then allowed to set in the mould for 18-20 hours, after which the hardened cement slab produced was removed from the mould and further cured for 28 days in water at room temperature.

At the end of the 28-day cure period, each moulded slab was removed from the water and cut into beams 12" × 1.5" × 1", which were then tested for flexural strength by subjecting them to three-point bending over a 10" span in a 12,000 lb. Avery universal test maching. The test beams were supported at both ends by support rollers ¾" in diameter and pressure was applied at the center of the sample by means of a loading roller 1" in diameter. Loading pressure was increased at the rate of approximately 1000. psi./min. Each beam was tested within 30 minutes of removal from the water in which it was cured.

The sample prepared with the addition of polyethylene oxide had an average flexural strength of 2850 psi. compared to an average flexural strength of 2060 psi. for the sample containing no polyethylene oxide additive. The flexural strength of the sample containing no polyethylene oxide represents the average results of 5 test beams. The flexural strength of the sample containing polyethylene oxide represents the average result of 6 test beams.

EXAMPLE 2

A formable cementitious composition was produced by admixing the ingredients shown in Table 2 below.

Table 2

| Constituent | Weight (grams) | Parts by Weight |
|---|---|---|
| Cement | 3000 | 100 |
| Carbon Fibers | 105 | 3.5 |
| Water | 1270 | 42.3 |

Eleven like compositions, differing from the composition set forth in Table 2 only by the addition of a polyethylene oxide additive, were also prepared. Table 3 below shows the polyethylene content of the twelve samples prepared. All parts by weight in each table are parts by weight per 100 parts by weight of cement.

Each polyethylene oxide solution employed was prepared by slowly adding the specified amount of polyethylene oxide to the water while stirring with a propeller, and then allowing the mixture to stand for 18-20 hours to permit complete dissolution. The polyethylene oxide employed, as in Example 1, was Polyox WSR-301.

In each instance, the polyethylene oxide solution (or water in the first instance) was admixed with the cement (which was a Portland cement conforming to British Standard 12) over a 3 minute period in a 5-gallon power-operated mixer using a dough hook attachment. Handfuls of carbon fibers were then added as mixing was continued for an additional 5 minutes. The carbon fibers employed, as in Example 1, were Hyfil 27 fibers chopped to a length of 6 mm.

After the cementitious compositions were prepared, they were moulded into slabs as in Example 1. The slabs were then cured, cut into test beams, and tested for flexural strength as described in Example 1.

The average flexural strengths obtained on 6 beams cut from each sample are set forth in Table 3 below. As is apparent from Table 3, increases in flexural strength of from 24-46 percent are generally obtained when the amount of polyethylene oxide employed exceeds about 0.14 parts per 100 parts of the dry constituent present, but that generally no improvement in flexural strength is observed when amounts below about 0.14 parts of polyethylene oxide are employed.

Table 3

| Sample No. | Polyethylene Oxide Content | | Flexural Strength of Cured Cement, psi. |
|---|---|---|---|
| | grams | parts by weight | |
| 1 | 0 | 0 | 2140 |
| 2 | 0.70 | 0.023 | 1760 |
| 3 | 1.31 | 0.044 | 2150 |
| 4 | 1.97 | 0.066 | 2530 |
| 5 | 2.63 | 0.088 | 2250 |
| 6 | 3.50 | 0.117 | 2060 |
| 7 | 4.38 | 0.146 | 3120 |
| 8 | 5.04 | 0.168 | 2720 |
| 9 | 5.69 | 0.190 | 2810 |
| 10 | 7.45 | 0.248 | 2320 |
| 11 | 9.00 | 0.300 | 2650 |
| 12 | 12.00 | 0.400 | 2790 |

EXAMPLE 3

A formable cementitious composition was prepared from the formulation set forth in Table 2 and 0.70 gram of polyethylene oxide. As in Example 2, the polyethylene oxide employed was Polyox WSR-301, the cement was a Portland cement, and the carbon fibers were Hyfil 27 fibers chopped to a length of 6 mm.

The amount of polyethylene oxide employed (0.70 gram) amounted to 0.023 part by weight per 100 parts by weight of the cement employed. Such amount of polyethylene oxide was added to the water employed while stirring with a propeller for 5 minutes to dissolve the polyethylene oxide. The carbon fibers were then added to the solution and pushed below the surface of the solution where they were mixed by hand for 3-4 minutes. The mixture was then added to the cement and mixed for 5 minutes in a 5-gallon power-operated mixer using a dough hook attachment.

After the cementitious composition was prepared, it was moulded into a slab as in Example 1. The slab was then cured, cut into test beams, and tested for flexural strength as described in Example 1.

The average flexural strength of 6 test beams was 1780 psi. This result is virtually identical to the result obtained in Example 2 when a like amount of polyethylene oxide was employed in an identical composition, but a slightly different mixing procedure was employed (see Table 3). This clearly establishes that the addition of very small amounts of polyethylene oxide to a carbon fiber-reinforced cementitious composition causes a measurable decrease in the flexural strength of structures produced therefrom. In general, an amount of polyethylene oxide in excess of 0.05 part per 100 parts by weight of cement is required to produce any increase in flexural strength.

What is claimed is:

1. In a process for incorporating strands of carbon fibers into an aqueous hardenable hydraulic cementitious matrix to produce a formable composition which can be set to produce a carbon fiber-reinforced cementitious structure, which process employs a polyethylene oxide having a molecular weight of from 500,000 to 5,000,000 to facilitate incorporation of the fibers into the matrix, the improvement which comprises employing at least 0.14 part by weight of the polyethylene oxide in the mix per 100 parts by weight of the dry components of the hydraulic cementitious matrix to deflocculate the fiber strands present and produce a composition from which structures having improved flexural strengths can be produced.

2. A process as in claim 1 wherein the sole component of the hydraulic cementitious matrix is cement.

3. A process as in claim 1 wherein the hydraulic cementitious matrix contains cement and an aggregate filler material.

4. A process as in claim 3 wherein the aggregate filler material is fly ash.

5. A process as in claim 4 wherein the fly ash is present in amounts up to 20 parts by weight of the total weight of cement and aggregate filler material.

6. A process as in claim 1 wherein the polyethylene oxide employed has a molecular weight of about 4,000,000.

7. A process as in claim 6 wherein the sole component of the hydraulic cementitious matrix is cement.

8. A process as in claim 6 wherein the hydraulic cementitious matrix contains cement and an aggregate filler material.

9. A process as in claim 8 wherein the aggregate filler material is fly ash.

10. A process as in claim 9 wherein the fly ash is present in amounts up to 20 parts by weight of the total weight of cement and aggregate filler material.

11. A process as in claim 1 wherein the amount of polyethylene oxide employed does not exceed 0.50 part by weight per 100 parts by weight of the dry components of the hydraulic cementitious matrix.

12. A process as in claim 11 wherein the sole component of the hydraulic cementitious matrix is cement.

13. A process as in claim 11 wherein the hydraulic cementitious matrix contains cement and an aggregate filler material.

14. A process as in claim 13 wherein the aggregate filler material is fly ash.

15. A process as in claim 14 wherein the fly ash is present in amounts up to 20 parts by weight of the total weight of cement and aggregate filler material.

16. A process as in claim 11 wherein the polyethylene oxide employed has a molecular weight of about 4,000,000.

17. A process as in claim 16 wherein the sole component of the hydraulic cementitious matrix is cement.

18. A process as in claim 16 wherein the hydraulic cementitious matrix contains cement and an aggregate filler material.

19. A process as in claim 18 wherein the aggregate filler material is fly ash.

20. A process as in claim 19 wherein the fly ash is present in amounts up to 20 parts by weight of the total weight of cement and aggregate filler material.

* * * * *